(12) United States Patent
Railkar et al.

(10) Patent No.: US 8,215,070 B2
(45) Date of Patent: Jul. 10, 2012

(54) SLATE STYLE ROOFING SYSTEM WITH INTEGRATED SOLAR PANELS

(75) Inventors: Sudhir Railkar, Wayne, NJ (US); Adem Chich, Kearney, NJ (US); Douglas Beck, Mountain Lakes, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 0 days.

(21) Appl. No.: 12/870,185

(22) Filed: Aug. 27, 2010

(65) Prior Publication Data

US 2011/0225904 A1 Sep. 22, 2011

Related U.S. Application Data

(60) Provisional application No. 61/315,532, filed on Mar. 19, 2010.

(51) Int. Cl.
*E04D 13/18* (2006.01)
*E04H 14/00* (2006.01)

(52) U.S. Cl. .......................... 52/173.3; 52/551

(58) Field of Classification Search .............. 52/173.3, 52/748.1, 543, 547–551, 506.05, 506.01, 52/747.11, 747.1; 136/244
See application file for complete search history.

(56) References Cited

U.S. PATENT DOCUMENTS

| | | | |
|---|---|---|---|
| 7,454,873 B2* | 11/2008 | McClintick | 52/551 |
| 2004/0144043 A1 | 7/2004 | Stevenson et al. | |
| 2008/0105291 A1 | 5/2008 | Pisklak et al. | |
| 2008/0302031 A1* | 12/2008 | Bressler et al. | 52/173.3 |
| 2009/0126782 A1 | 5/2009 | Krause et al. | |

OTHER PUBLICATIONS

International Search Report—PCT/US2011/028942.
Written Opinion—PCT/US2011/028942.

* cited by examiner

*Primary Examiner* — Brian Glessner
*Assistant Examiner* — Brian D Mattei
(74) *Attorney, Agent, or Firm* — Womble Carlyle Sandridge & Rice LLP (57) ABSTRACT

A roofing system includes battens and hangers for installing slate roofing shingles on a roof. Electrical conductors and other electronics are incorporated into the battens and the battens are connected together to form an electrical transmission grid beneath the shingles. Solar panels are installed in place of slate shingles in some locations on the roof and are configured to match or complement the surrounding slate shingles. Each solar panel includes a connector that connects the solar panel to the electrical transmission grid. The grid thus collects the electrical energy generated by all of the solar panels and delivers it for storage or use in a home. Microinverters may be coupled to smaller groups of the solar panels for converting their DC voltage to AC voltage and the outputs of the microinverters connected to a remote location for use or storage.

6 Claims, 8 Drawing Sheets

SLATE STYLE ROOFING SYSTEM WITH INTEGRATED SOLAR PANELS

REFERENCE TO RELATED APPLICATION

Priority is hereby claimed to the filing date of U.S. provisional patent application No. 61/315,532 filed on Mar. 19, 2010.

TECHNICAL FIELD

This disclosure relates generally to roof mounted solar panels and more particularly to solar panels that are building integrated with a slate style roof, meaning that the solar panels blend into the appearance of the roof.

BACKGROUND

Slate is one of the finest roofing materials because, among other things, it is fireproof, resists hail damage, and can have a service life of 100 years or more. While natural slate has been common for decades, resent years have seen the emergence of man-made slate roofing that can rival the look and durability of natural slate. Slate roofing also is considered an architectural match for certain home styles.

Slate roofing can be installed in a variety of ways. Traditionally, slate shingles were installed on roof decks with nails driven through holes in the shingles. However, this proved to present certain problems related, among other things, to the external weight of the shingles and the consequent enhanced framing required, as well as other factors, which often caused cracking of the brittle slate material. More recently, an improved slate roof installation system has been developed by Elk Premium Building Products, Inc. (now GAF/ELK) and is marketed under the trademark TruSlate™. Generally speaking, the TruSlate roofing system involves the installation of underlayment and spaced apart metal battens extending along a roof deck. Spring tempered hangers are attached to the battens and extend down the roof deck to upwardly hooked ends. A waterproof slate liner is laid along a row of hangers and individual slate shingles are hung on the hangers in overlapping rows along the roof deck. The result is a classic and stately slate roof that does not exhibit problems caused by stress and roof deck movement. U.S. Pat. Nos. 7,448,177 and 7,454,873 disclose the TruSlate roofing system in detail and the entire contents of these patents is hereby incorporated by reference.

Solar electrical energy also is becoming more common as energy prices rise and cultural trends toward greener ways of life are more prevalent. One way of supplementing electrical needs with solar energy is to mount arrays of photovoltaic solar panels on one's roof. The panels are often mounted within frames and are electrically coupled together and connected to a home's electrical service and/or to battery banks to provide electrical energy from the sun. While such arrays of solar panels indeed provide supplemental electricity, many consider them unsightly on a roof and therefore would not invest in such a system. A need exists for a roof-mounted photovoltaic solar energy collection system that is straightforward to install, easily updated to higher electrical production levels, and that is building integrated, meaning that it blends into the architecture of the building and particularly is flush with the roof of the building. It is to the provision of such a system that the present invention is primarily directed. Ideally, aesthetics and weathering of the photovoltaic system is integral with the exposed materials or is in fact both photovoltaic and reflective material.

SUMMARY

The entire disclosure of U.S. provisional patent application No. 61/315,532, to which priority is claimed above, is hereby incorporated by reference.

Briefly described, a modified TruSlate type roofing system includes a batten and hanger system for mounting roofing tiles on a roof as described above and detailed in the incorporated patent documents. The battens however are modified ("modified battens") to incorporate wiring, connectors, fuses, and/or specialty electrical parts for transmitting electrical energy along the lengths of the battens. Rows of modified battens may be electrically coupled together at or between their ends to form an electrical transmission grid incorporating multiple rows of battens. Alternatively, EPDM rubber roofing may be converted to very flat "ribbon wiring" to form an electrical grid on the roof. Individual solar panels are sized to match the size of slate shingles for the TruSlate roof, and also have a texture and appearance that matches or at least compliments and is flush with the texture and appearance of slate shingles. The solar panels are installed in a manner similar to the installation of standard slate shingles; that is, they are hung from the battens on the hanger system, as discussed above. However, before being hung, each solar panel is connected to the electrical transmission grid by being connected to the wiring carried by an adjacent batten. Solar panels can be incorporated in this manner at random locations on the roof in place of TruSlate shingles, and the electrical output from all of the solar panels is collected by the grid so that it can be delivered to a home's electrical supply or battery storage for use. Alternatively, preselected areas of the roof can be shingled with solar panels if desired to provide maximum exposure to the sun. In any event, the solar panels match or compliment and are substantially flush with surrounding slate shingles of the roof and thus do not present an unsightly appearance as have prior art roof mounted solar panel arrays. Existing slate shingles can easily be replaced with photovoltaic panels and/or photovoltaic panels can be changed out if necessary in a simple and easy manner.

Thus, solar electrical energy collection system is now provided that is easily installed and incorporated within the TruSlate roofing system, that forms an integrated solar collection grid regardless of where the individual solar panels are installed, that allows the solar panel array to be increased in size by easily adding additional solar panels, and that does not present an unsightly appearance on the roof. The invention allows great flexibility to change, add, or expand the photovoltaic system of a home since it is a simple matter to remove slate shingles and replace them with photovoltaic panels of the invention and also a simple matter to replace photovoltaic panels when necessary. These and other aspects, features, and advantages of the invention will become more apparent upon review of the detailed description set forth below when taken in conjunction with the accompanying drawing figures, which are briefly described as follows.

DETAILED DESCRIPTION

Figure 1:
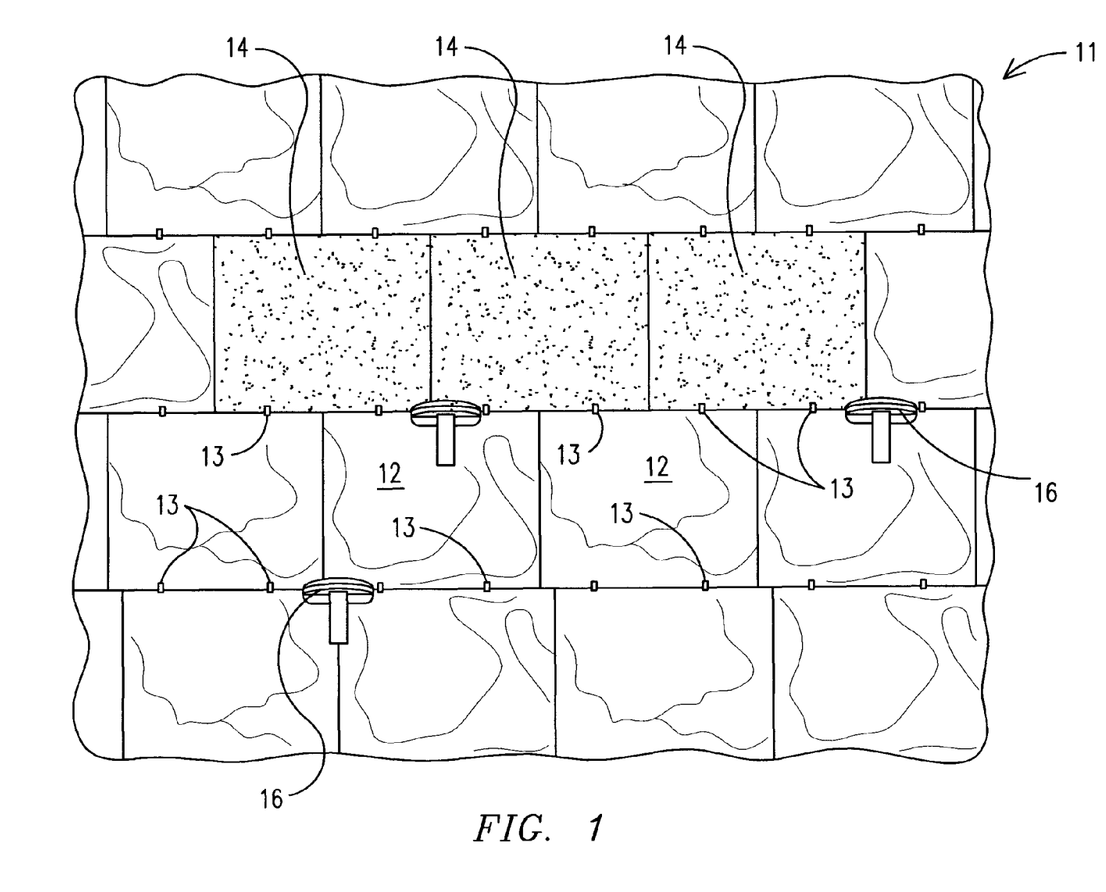
FIG. 1 is an image of a TruSlate solar roofing installation with a row of solar panels according to an aspect of the invention.

Referring now in more detail to the drawing figures, wherein like reference numerals indicate like parts throughout the several views, FIG. 1 illustrates a TruSlate slate roof installation generally as described in the incorporated references but with integrated solar panels according to the present disclosure. In general, the roofing installation 11 includes an array of slate shingles 12 supported on hangers 13 covering the roof deck. Solar panels 14 are substantially the same size as the slate shingles and are installed in place of shingles at selected locations on the roof. Preferably, the solar panels are configured to match or complement the look of the shingles so that the shingled roof with solar panels retains its architectural appeal and the solar panels do not look unsightly on the roof. As are the slate shingles, the solar panels are supported on hangers 13 as described in more detail below. Snow guards 16 are shown in some of the figures, but are not part of the invention and my be eliminated where not needed.

Figure 2:
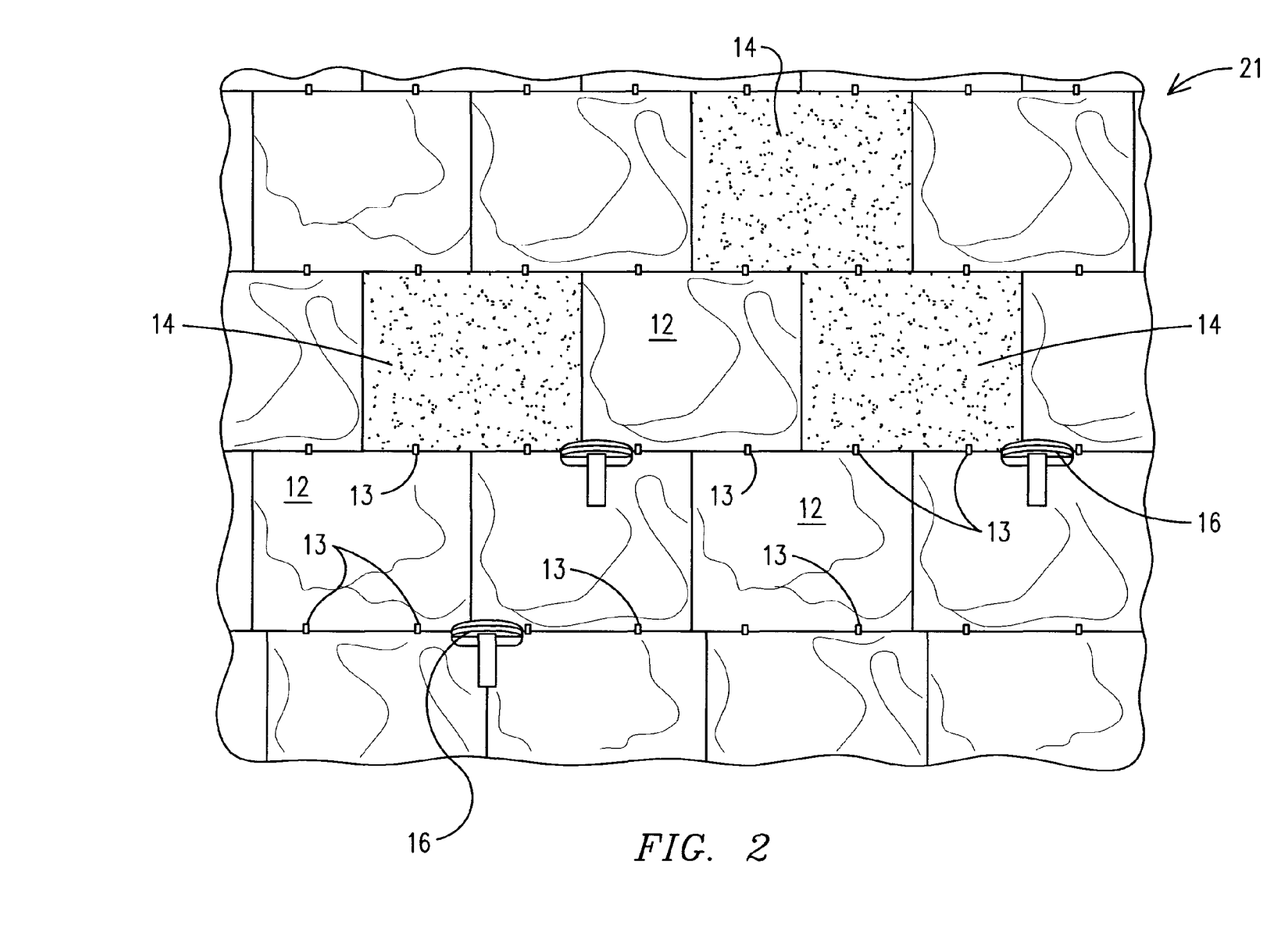
FIG. 2 is an image of a TruSlate solar roofing installation with randomly positioned solar panels according to another aspect of the invention.

FIG. 2 illustrates another TruSlate slate roof installation 21 with integrated solar panels according to the present disclosure. In this installation, slate shingles 12 are supported by hangers 13 per the TruSlate system as in the installation of FIG. 1. However, in FIG. 2, solar panels 14 are mounted at random selected locations in the field of slate shingles rather than mounted together or in a line. This illustrates an aspect of the invention wherein solar panels can be installed in any desired arrangement on the roof deck and, as described below, all of the solar panels, regardless of their locations, are electrically coupled together so that electrical power generated by the array of panels is available for use or storage.

Figure 3:
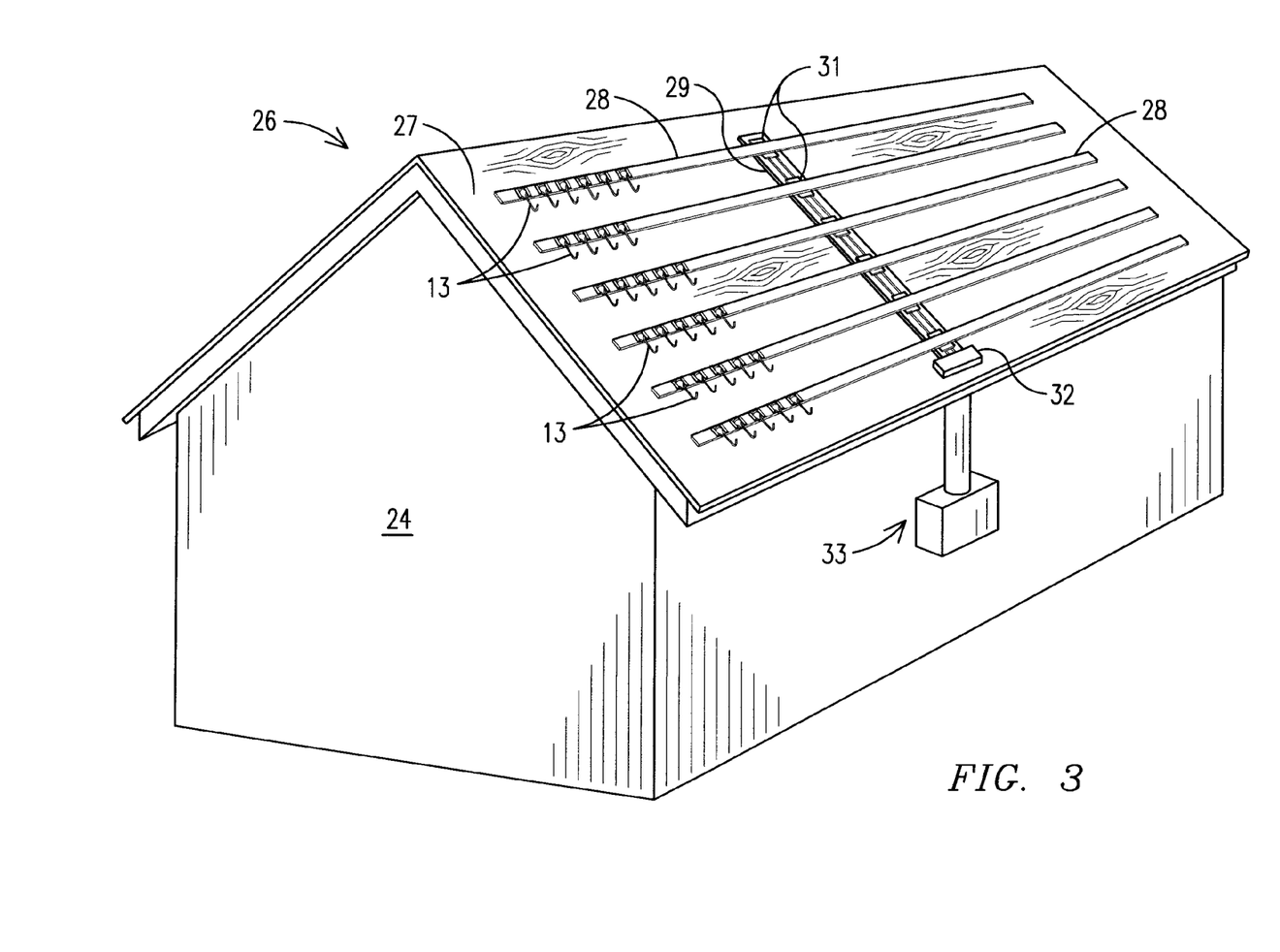
FIG. 3 is a simplified schematic illustrating a roof with an array of modified battens coupled together to form an electrical transmission grid according to the invention.

FIG. 3 illustrates a TruSlate style batten and hanger system attached to a roof deck much as described in the incorporated patents. Here, however, the battens are modified according to the present disclosure so that they incorporate wires, connectors, fuses, and specialty electronic parts as needed to collect and transmit electrical energy from solar panels installed as shown in FIGS. 1 and 2. Preferably, but not necessarily, such components all become an integral part of the batten. With more specific reference to FIG. 3, a dwelling 24 has a roof 26 with a roof deck 27, which preferably is covered by an underlayment material as is known in the art. Modified battens 28, detailed below, are attached to the roof deck and extend in spaced relationship along the length of the roof as shown. The modified battens are formed with spaced apart hanger holders 37 (FIG. 4) that receive and secure a plurality of hangers 13 arranged in spaced relationship. The hangers may be spaced about six inches apart to support 12 inch by 12 inch slate shingles and solar panels.

Figure 7:
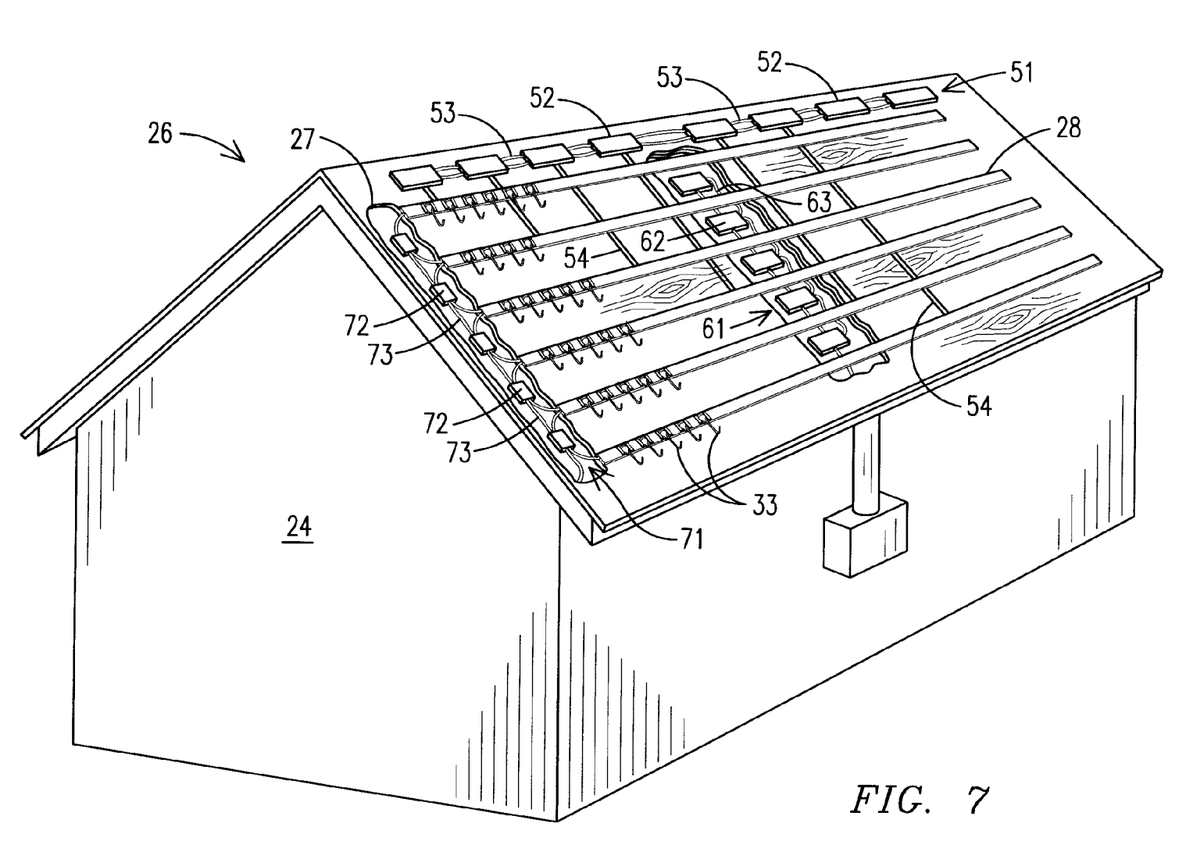
FIG. 7 illustrates an alternate configuration of an electrical transmission grid using interconnected microinverters.
Figure 8:
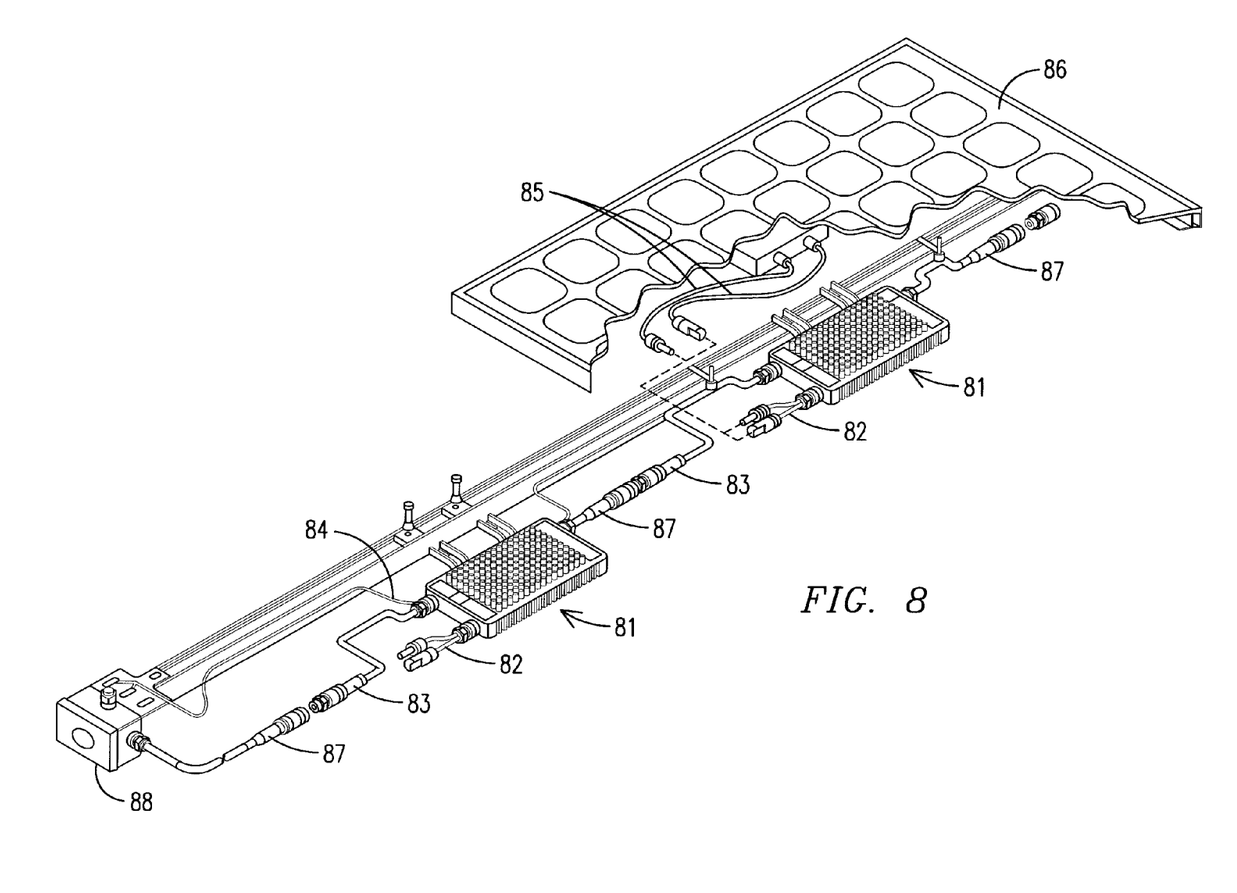
FIG. 8 is a detailed connection diagram for coupling microinverters to corresponding solar panels and to each other in an electrical transmission grid.

Each batten is provided with at least two conductors 39 and 41 (FIG. 4) that extend along the length of the batten. Solar panels installed in the roofing installation are each electrically connected to the conductors of an adjacent batten in such a way that electrical energy produced by each solar panel is transmitted to the conductors of the batten. An electrical harness 29 is mounted on the roof deck and may include at least two conductors extending along its length and a series of spaced electrical junctions 31. The junctions 31 intersect the battens 28 and, at each junction, the electrical conductors of a corresponding batten are electrically connected through the junction to the electrical conductors of the harness 29. In this manner, the conductors of all of the battens are electrically connected together in parallel to form an electrical transmission grid on the roof deck. The conductors of the harness 29 may be electrically connected at a junction box 32 to a known solar/utility interface, which may direct solar generated electricity to batteries for storage or to converters that transform it so that it may be used immediately as part of a home's electrical service. While the harness is shown at a particular location in the figure as one example, it will be understood that it can be located anywhere along the roof deck such as, for instances, along and connecting the ends of the battens. An alternate electrical transmission grid using microinverters is illustrated in FIGS. 7 and 8, which are described below.

Figure 4:
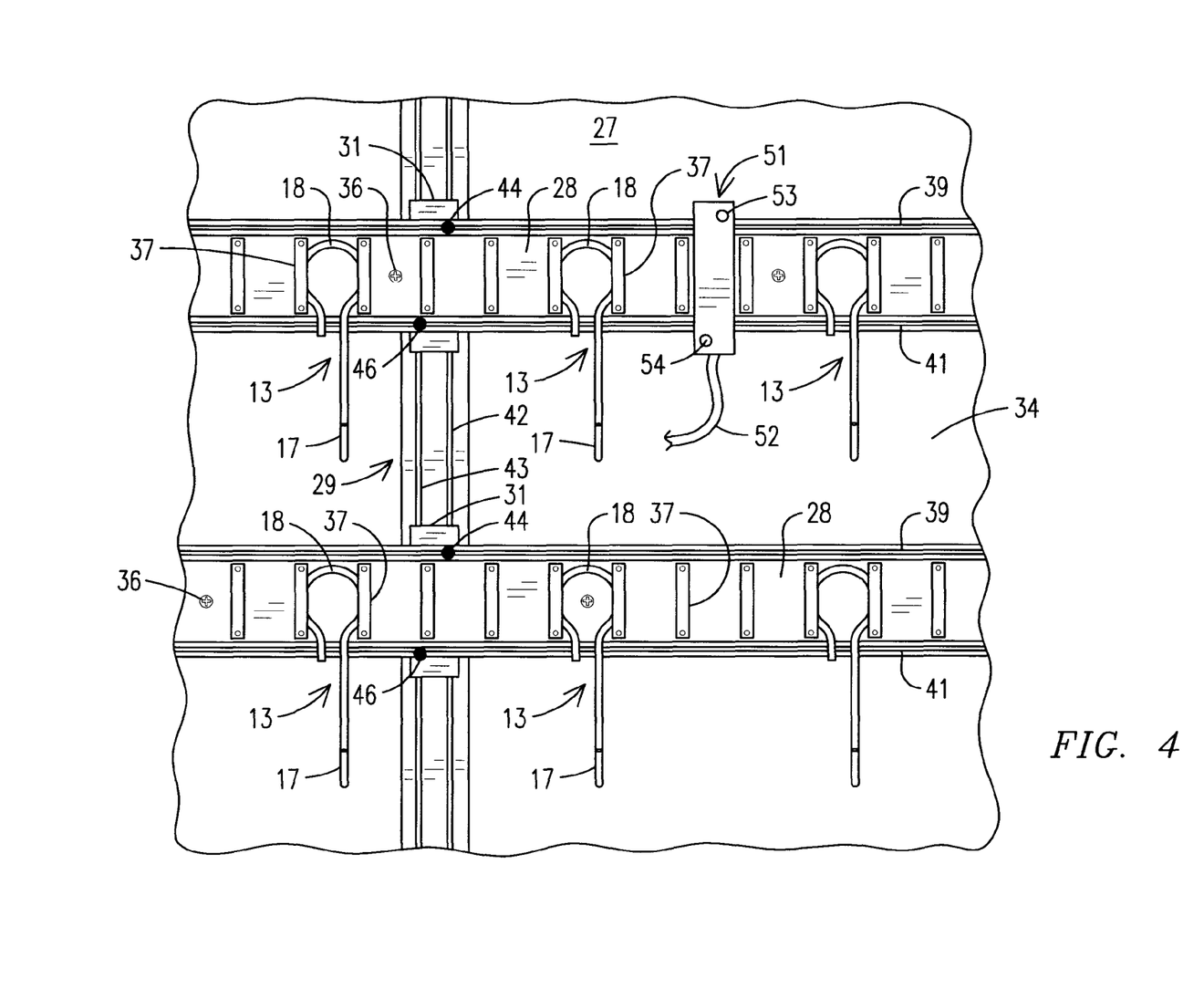
FIG. 4 is a top plan view of a section of roof deck with modified battens and cross harness attached to form an electrical distribution grid. This figure shows wires in the batten or EPDM film.

FIG. 4 is a more detailed illustration of the modified battens and related elements according to one possible embodiment of the present disclosure. Each batten 28 is provided with a series of spaced hanger holders 37, which, in this embodiment, comprise punched-out and raised ribs in the mid portion of the batten. Hangers 13 are secured to the battens and extend downwardly therefrom to hooked ends 17. As described in the incorporated patents, the hangers preferably are formed of tempered spring steel and their upper ends form spring clips 18. The spring clips 18 may be squeezed together, placed between two adjacent hanger holders, and released to lock the hanger into place on the batten. Slate shingles and solar panels are supported on the roof deck by the hooked ends 17 of the hangers 13, which cradle the lower edges of the shingles and panels, and by the hangers above, which extend over the top edges of the shingles and panels.

In the illustrated embodiment, electrical conductors 39 and 41 are incorporated into, extend along the length of, and are an integral part of the battens 28. The conductors 39 and 41 are insulated from each other and from the batten. Two conductors are illustrated, but more than two can be included if desired. Further, while the conductors are illustrated extending along the edge portions of the battens, this is shown only for purposes of illustration and the conductors can be positioned at other locations on the battens within the scope of the invention. Other electrical components not shown in the figures also may be incorporated into the battens such as, for example, connectors, fuses, and specialty electrical parts, all of which are sized for conducting a preselected electrical current.

A wiring harness 29 is secured to the roof deck and spans the space between battens 28. The wiring harness incorporates at least two electrical conductors 42 and 43 for transmission of electrical current. In the illustrated embodiment, the wiring harness 29 extends beneath the battens and is located at a midpoint between their ends; however, this is only an example and a wide variety of other configurations might be used. The wiring harness further includes a plurality of electrical junctions 31 at the intersections of the harness with the battens. Each of the junctions includes a first connector 44 that electrically connects the conductor 39 of the corresponding batten to the conductor 42 of the wiring harness. Similarly, a second connector 46 of each junction electrically connects the conductor 41 of each batten to the conductor 43 of the wiring harness. It will thus be seen that the conductors 39 and 41 of the battens 28 are all connected together in parallel through the wiring harness to form an electrical transmission grid on the roof deck. The wiring harness may be constructed of ethylene propylene diene Monomer (EPDM) rubber encasing conductors 42 and 43 to form "ribbon wiring" which is very flat, suitable for long life, and already used for transatlantic wiring and in the TruSlate roofing system of the incorporated patents.

In the illustrated embodiment, which is not limiting, panel connectors 51 may be located anywhere in the batten and are provided for electrically connecting a solar panel to the conductors 39 and 41 of an adjacent batten. Each panel connector is configured to fit onto an adjacent batten and includes terminals 53 and 54 designed to make electrical contact with the conductors 39 and 41 of the batten. The terminals 53 and 54 also are connected to wires 52 which, in turn, are coupled to receive electrical power from a solar panel (not shown). It will thus be appreciated that a solar panel 14 can be connected to the electrical transmission grid by attaching its connector 51 to an adjacent batten and securing its terminals in electrical contact with the conductors of the batten. Further, all such solar panels connected to any batten at any location become connected to the electrical transmission grid, allowing each solar panel to contribute to the total electrical power developed by all of the solar panels. This electrical power is transmitted along the conductors of the battens to the conductors of the wiring harness 29, which deliver the power to a system for storing or using the solar generated electricity.

Figure 5:
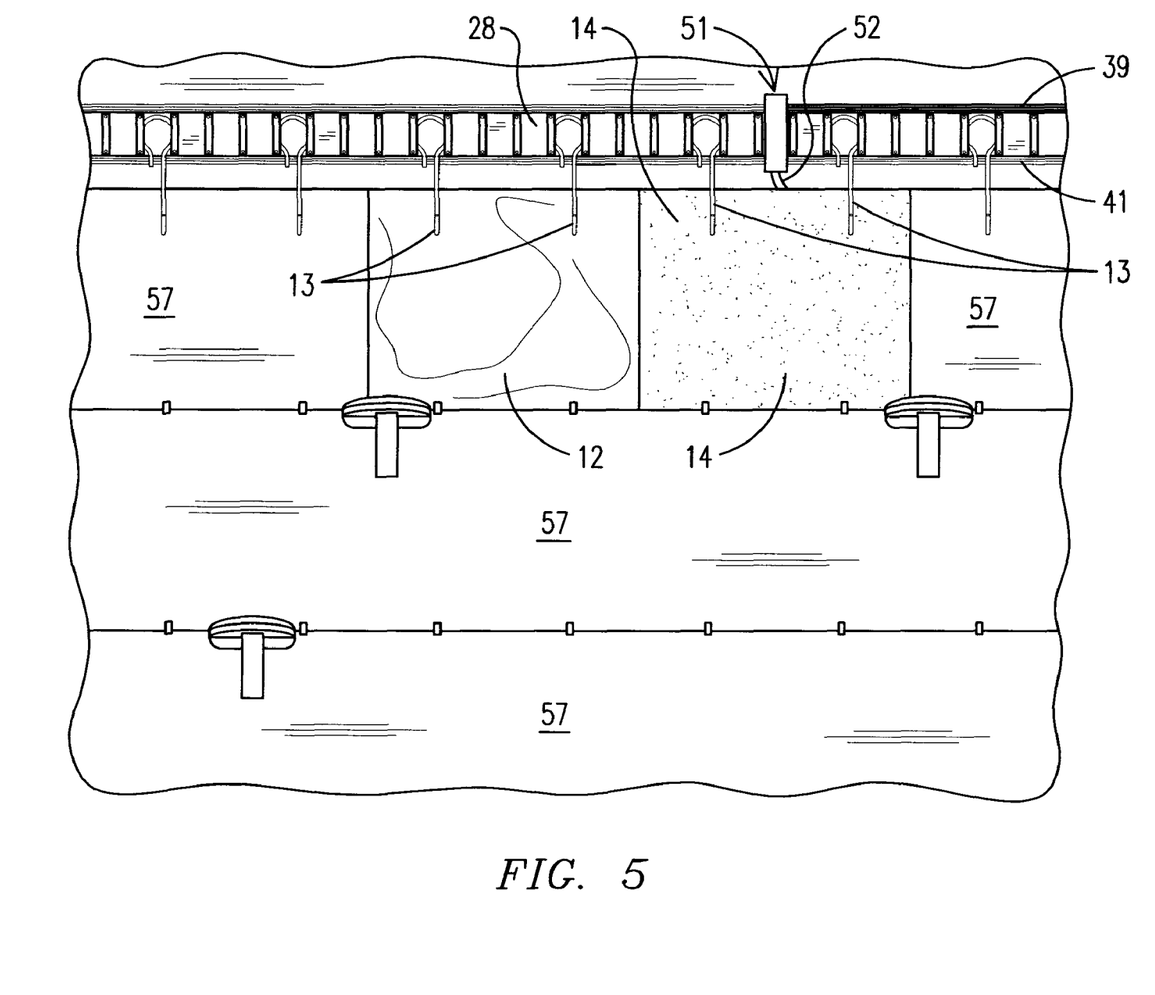
FIG. 5 illustrates the installation of slate shingles and solar panels with the system of this disclosure.
Figure 6:
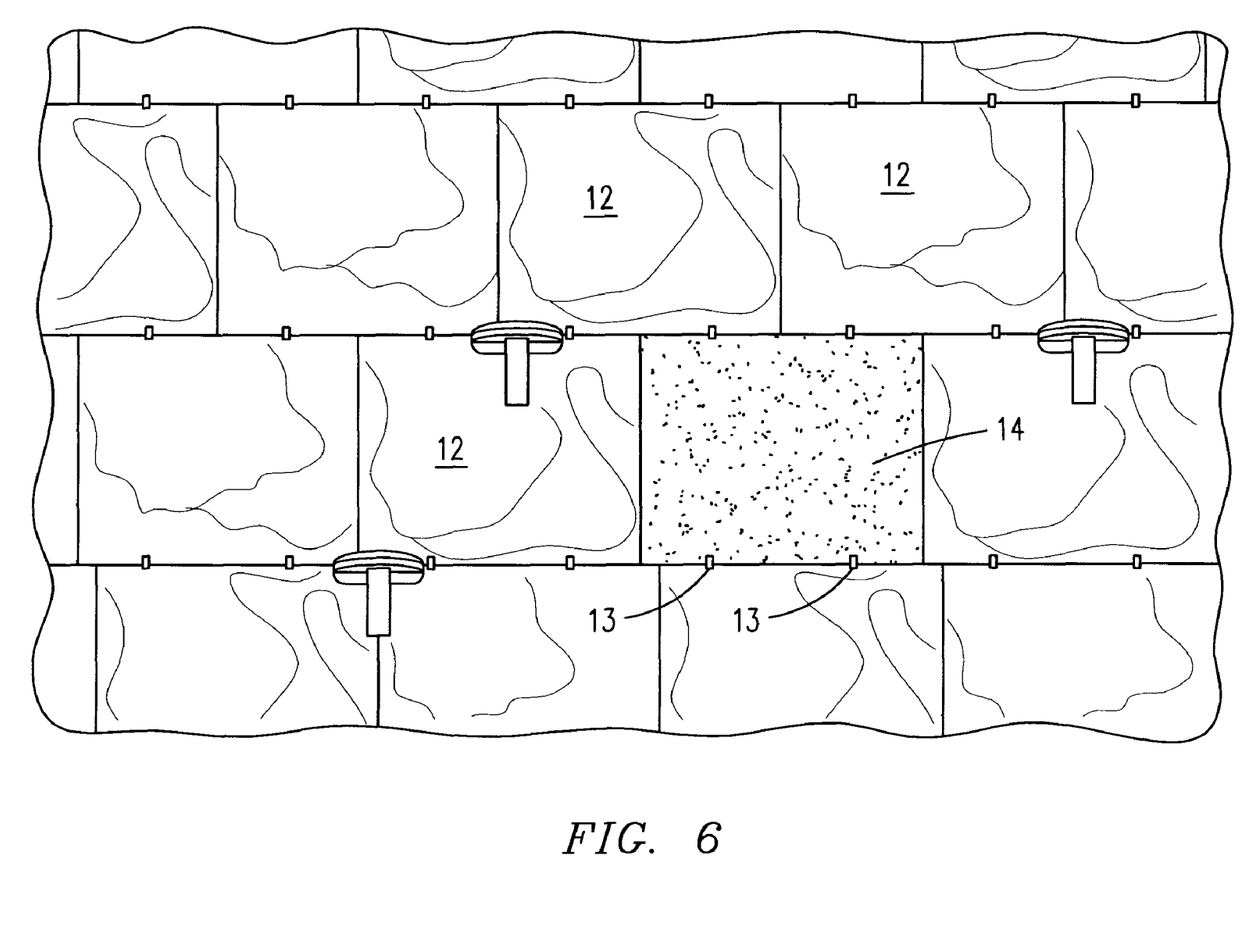
FIG. 6 illustrates a solar panel installed in a field of slate shingles according to the disclosure and illustrates easy attachment of shingles to the wire grid.

FIG. 5 shows a partial installation of a slate style roof with integrated solar panels according to the disclosure. In this image, slate liner 57, which may be a strip of high density polyethylene, EPDM rubber, or the like, is shown installed in the hangers such that it will be located beneath tiles 12 and solar panels 14, one each of which is shown, as per TruSlate directions. The solar panel 14 is shown connected electrically to the electrical transmission grid through connector 51 and wire 52 as discussed above. Both the slate shingle 12 and the solar panel are supported along their bottom edges by hooked edges of hangers 13 and are held down along their top edges by the hangers of the next higher batten. FIG. 6 illustrates a completed installation with a plurality of slate shingles 12 and at least one solar panel 14 installed per the present disclosure. Alternately, wires 39 and 41 can be outlets for making connections.

FIG. 7 illustrates an alternate embodiment of an installation according to this disclosure wherein the electrical transmission grid includes a plurality of interconnected microinverters. In order to be grid compatible; i.e., able to be placed Microinverters are a relatively recent development and generally replace a large central inverter for converting the DC voltage produced by solar panels to and AC voltage usable with appliances and compatible with the public grid. Enphase Energy, Inc. of Pentaluma, Calif. (www.emphaseenergy.com) is one manufacturer of microinverters usable with solar energy systems. Before microinverters, the panels of a solar panel array generally were interconnected to gang their DC outputs and the resulting total output was directed to a large central inverter for converting the output to AC. This AC voltage could then be applied to a home's electrical grid for use. This system has several drawbacks, including the requirement that all the panels of the array be located together, and the relatively expensive central inverter that usually requires ancillary cooling. Microinverters take the place of a central inverter. In a microinverter solar array, each photo voltaic panel of the array of panels is connected to its own microinverter, which inverts the DC output of that panel to AC. The outputs of the several microinverters are then ganged together by connecting the microinverters together in series. As a result, the final output of the solar array is an AC voltage that is immediately ready for use and immediately compatible with the public electric grid. Commercial microinverters typically are provided with internal ground fault interrupt (GFI) circuitry that shuts down the inverter in the event that an unexpected grounding or arc is detected.

In FIG. 7, a dwelling 24 has a roof 26 with a roof deck 27, which preferably is covered by an underlayment material as is known in the art. Modified battens 28, detailed below, are attached to the roof deck and extend in spaced relationship along the length of the roof as shown. The modified battens are formed with spaced apart hanger holders 37 (FIG. 4) that receive and secure a plurality of hangers 13 arranged in spaced relationship. The hangers may be spaced about six inches apart to support 12 inch by 12 inch slate shingles and solar panels. Each batten is provided with at least two conductors 39 and 41 (FIG. 4) that extend along the length of the batten. Solar panels installed in the roofing installation are each electrically connected to the conductors of an adjacent batten in such a way that electrical energy produced by each solar panel, in the form of a DC voltage, is transmitted to the conductors of the batten.

An array of microinverters is electrically connected to the DC outputs of the solar panels. More specifically, each modified batten may have its electrical conductors connected to the input of a microinverter dedicated to the solar panels connected to that particular batten. Thus, the individual solar shingles of a row become a solar panel with its DC voltage output being converted to an AC voltage by the microinverter. Other options are possible, such as assigning a portion of the solar shingles in a row to a microinverter and another portion to another microinverter. One or more solar shingles in a column of shingles also may be connected to a dedicated microinverter if desired, although wiring considerations must be addressed. In any event, each microinverter of an array of microinverters is dedicated to one our more solar shingles that together make up a solar "panel."

The microinverters of the array can be positioned in any convenient location with respect to the shingled roof of this disclosure. Three options are illustrated in FIG. 7, although more are possible. Array 51, for example, comprises individual microinverters 52 disposed generally along the ridge of the roof 26 and appropriately connected together in series by connections 53. In the illustrated embodiment, each microinverter has a DC input that may be coupled to one or more of the battens of the shingle system by means of wires or wire harnesses 54. Again, other means and configurations of connecting the microinverters are possible and within the scope of the present invention. A second option is illustrated at 61, where the array of microinverters is located below the roof deck in the attic of the dwelling 24. The array 61 comprises a plurality of microinverters 62 coupled in series by wires 63 with each converter having an input connected to a modified batten 28. Each microinverter thus services the solar shingles of a row. The microinverters are connected in series and deliver their combined AC power to the home for immediate or to the public electrical grid. The third configuration is similar but the array 71 of microinverters 72 is located at the ends of the modified battens 28 and along the edge of the roof 26. They may be disposed below the roof deck, connected together in series, and coupled to the local or public electrical grid.

FIG. 8 illustrates in detail the connection of microinverters to solar panels according to the instructions of one supplier, Enphase Energy, Inc. Each microinverter 81 has DC inputs 82 that are connected to the outputs 85 of a solar panel 86. In the case of the present disclosure, the solar panel may include several solar shingles and the output may be the conductors of a modified batten. In any event, each microinverter has a serial AC power input 87 and a serial AC power output 83. The AC output of each microinverter is connected to the AC input of another microinverter so that the microinverters in the array are ganged together in serial fashion. The composite AC voltage may be directed to a junction box 88, from which it may be connected to a home's or the public electrical grid. A ground wire connects the chassis of the microinverters together so that the GFI circuitry within each microinverter can detect a ground fault or arc and shut down the inverter in that event. One advantage of microinverters is the redundancy provided by multiple inverters. If one micro inverter malfunctions or is shut off due to a ground fault, the remaining microinverters in the array continue to provide AC power to the grid.

While a particular configuration of elements has been shown as an example of various ways to practice the invention, a wide range of variations, additions, changes, and modifications might well be made by skilled artisans within the scope of the invention. For example, the electrical conductors incorporated into the battens need not be located as depicted, but instead may be incorporated at a variety of locations in a variety of ways. Indeed, the electrical conductors to which the solar panels connect may be incorporated into other elements of the system such as in the slate liner that underlies the shingles and solar panels. The clips 17 in FIG. 4 can be changed to a specialized clip so that it can hold photovoltaic panels in place and also make the electrical connections between the panel and the electrical grid. Similarly, rather than a pair of wires, the battens themselves can be grounded leaving only one wire 39 to be connected, the other connection being made through the grounded battens. Further, the electrical harness illustrated and described above is exemplary only and a wide variety of structures and configurations might be substituted to interconnect the conductors of the shingle courses to which the solar panels are connected. Indeed, the harness need not be on the deck of the roof, but can be incorporated into the attic of a dwelling. In the illustrated embodiment, the electrical grid is configured to connect all of the solar panels together in parallel. This results in a solar power system capable of delivering higher current at a given voltage, the voltage produced by one of the solar panels. The wiring configuration can be modified if desired to connect solar panels in series for producing higher voltages and associated higher current capability. Combinations of parallel and series wiring may be designed into the system to produce a desired output voltage and/or current capability. The microinverters need not be from Enphase Energy, Inc. as depicted, but may be of different configurations from different suppliers. These and other changes, substitutions, and revisions might well be made by skilled artisans without departing from the spirit and scope of the invention.

What is claimed is:

1. A roofing system comprising:
    a roof deck
    a plurality of elongated battens arranged on the roof deck in spaced generally parallel relationship relative to each other;
    a first uninterrupted electrical conductor incorporated into and extending along the length of selected ones of the elongated battens;
    a second uninterrupted electrical conductor incorporated into and extending along the length of the selected ones of the elongated battens, the second electrical conductor being electrically insulated from the first electrical conductor;
    shingle hangers attached to each of the elongated battens and arranged in spaced relationship therealong;
    a plurality of roofing shingles arranged in courses on a roof deck, the roofing shingles being removably held in place on the roof deck by the shingle hangers;
    at least one solar panel installed on the roof deck in place of a roofing shingle, the solar panel being configured to match or complement the surrounding roofing shingles the solar panel having a pair of electrical conductors electrically insulated from each other and carrying positive and negative voltage respectively that is produced by the solar panel when the solar panel is exposed to sunlight;
    the pair of electrical conductors of the solar panel terminating in a connector, the connector being removably attached to an adjacent batten and being configured to establish an electrical connection between one electrical conductor of the solar panel and the first electrical conductor of the batten and between the other electrical conductor of the solar panel and the second electrical conductor of the batten; and
    a wiring harness on the roof deck, the wiring harness having at least two electrically insulated electrical conductors and a plurality of electrical junctions configured to attach to respective ones of the battens and to couple the two electrical connectors of the wiring harness to the first and second electrical connectors of the selected battens to form an electrical transmission grid, the wiring harness carrying electrical energy produced by the solar panel to a remote location for use.

2. The roofing system of claim 1 and wherein the roofing shingles are slate-style shingles.

3. The roofing system of claim 2 and wherein the slate-style shingles are natural slate shingles.

4. The roofing system of claim 1 and further comprising at least one microinverter associated with the solar panel for converting a DC voltage of the solar panel to AC voltage.

5. A prewired hanger system for supporting slate-style shingles on a roof deck, the hanger system being configured to receive and support slate-style shingles in courses on the roof deck and to receive photovoltaic panels in place of at least some of the slate-style shingles, the hanger system comprising:
    a plurality of elongated battens configured to be arranged on the roof deck in spaced generally parallel relationship relative to each other;
    a first electrical conductor incorporated into and extending along the length of selected ones of the elongated battens
    a second electrical conductor incorporated into and extending along the length of the selected ones of the elongated battens, the second electrical conductor being electrically insulated from the first electrical conductor;
    shingle hangers configured to be attached to each of the elongated battens in spaced relationships therealong, each shingle hanger having a hooked end for receiving an edge of a shingle to support the shingle on a roof to which the prewired hanger system is mounted;
    a wiring harness having at least two electrically insulated conductors and a plurality of electrical junctions configured to attach to respective ones of the battens and to couple the two electrical conductors of the wiring harness to the first and second electrical conductors of the selected battens to form an electrical transmission grid;

at least one solar panel having a pair of electrical conductors electrically insulated from each other and carrying positive and negative voltage respectively that is produced by the solar panel when the solar panel is exposed to sunlight; and a connector terminating the pair of electrical conductors of the solar panel, the connector being removably attachable to an adjacent batten and being configured to establish an electrical connection between one electrical conductor of the solar panel and the first electrical conductor of the batten and between the other electrical conductor of the solar panel and the second electrical conductor of the batten.

6. The prewired hanger system of claim 5 and further comprising a microinverter configured to be coupled to a the electrical connectors terminating the pair of electrical conductors of the solar panel for converting DC voltage from selected the solar panel to AC voltage.

* * * * *